United States Patent
Tang et al.

(10) Patent No.: US 10,967,423 B2
(45) Date of Patent: Apr. 6, 2021

(54) EXPANDABLE COPOLYMER RESIN USED FOR MANUFACTURING LOST FOAM CASTING MODEL AND PREPARATION METHOD THEREOF

(71) Applicant: HANGZHOU YUHANG YATAI CHEMICAL INDUSTRIES CO., LTD., Zhejiang (CN)

(72) Inventors: Suoyun Tang, Zhejiang (CN); Guohua Lu, Zhejiang (CN)

(73) Assignee: HANGZHOU YUHANG YATAI CHEMICAL INDUSTRIES CO., LTD., Hangzhou (CN)

( * ) Notice: Subject to any disclaimer, the term of this patent is extended or adjusted under 35 U.S.C. 154(b) by 32 days.

(21) Appl. No.: 16/522,689

(22) Filed: Jul. 26, 2019

(65) Prior Publication Data
US 2020/0368807 A1 Nov. 26, 2020

(30) Foreign Application Priority Data
May 23, 2019 (CN) .......................... 201910437159.2

(51) Int. Cl.
*B22C 7/02* (2006.01)
*C08J 9/04* (2006.01)
*C08J 9/14* (2006.01)
*C08J 9/20* (2006.01)
*C08K 5/00* (2006.01)
*C08K 5/098* (2006.01)
*C08K 5/372* (2006.01)

(52) U.S. Cl.
CPC .............. *B22C 7/023* (2013.01); *C08J 9/141* (2013.01); *C08J 9/142* (2013.01); *C08J 9/20* (2013.01); *C08K 5/005* (2013.01); *C08K 5/098* (2013.01); *C08K 5/372* (2013.01); *C08J 2201/022* (2013.01); *C08J 2325/14* (2013.01); *C08J 2467/04* (2013.01); *C08J 2471/00* (2013.01); *C08J 2475/04* (2013.01)

(58) Field of Classification Search
CPC .. B22C 7/023; C08J 9/142; C08J 9/141; C08J 9/20; C08J 2467/04; C08J 2471/00; C08J 2475/04; C08J 2325/14; C08J 2201/022; C08K 5/005; C08K 5/372; C08K 5/098
See application file for complete search history.

(56) References Cited

U.S. PATENT DOCUMENTS

2003/0195265 A1* 10/2003 Tang .................... C08J 9/20 521/50
2016/0326332 A1* 11/2016 Zou .................... C08J 9/224

FOREIGN PATENT DOCUMENTS

CN 1589185 A 3/2005

\* cited by examiner

*Primary Examiner* — Kara B Boyle

(57) ABSTRACT

The invention discloses an expandable copolymer resin used for manufacturing a lost foam casting model and a preparation method thereof, wherein the molecular weight of the expandable copolymer resin is 150000-300000, and the expandable copolymer resin comprises mixed monomers, deionized water, a cellulose ether dispersant, sodium salt, an initiator, a foaming agent and a molecular weight regulator; the mixed monomers comprise MMA and ST, wherein MMA accounts for 70-95% wt of the mixed monomers, and ST accounts for 5-30% wt of the mixed monomers. The model formed by the expandable copolymer resin has the advantage of reducing or eliminating carbon defects of castings when casting cast iron and cast steel.

6 Claims, No Drawings

EXPANDABLE COPOLYMER RESIN USED FOR MANUFACTURING LOST FOAM CASTING MODEL AND PREPARATION METHOD THEREOF

CROSS-REFERENCE TO RELATED APPLICATIONS

The present application claims priority to Chinese patent application No. 201910437159.2 filed on May 23, 2019, all contents of which are hereby incorporated by reference in their entirety.

TECHNICAL FIELD

The invention relates to the field of lost foam casting materials, and in particular to an expandable copolymer resin used for manufacturing a lost foam casting model and the preparation method thereof.

BACKGROUND ART

Lost foam casting is a new casting process developed in the 1980s. The key technology of lost foam casting is to replace traditional wood model, wax model, or the like with foam plastic models, which renders the following advantages:
1. the size precision and the surface smoothness of the casting are higher than those of a sand casting;
2. less organic waste gas is discharged, and clean production is readily realized; and
3. the casting has a great degree of flexibility in structural design, and a structure to be assembled by machining a plurality of parts can be integrally cast by bonding after the die is manufactured in sections, so that the cost required by assembly and machining is greatly saved.

In order to achieve the above-mentioned advantages of a lost foam casting, the key point lies in the high quality of the modeling material. The traditionally used modeling material is expandable polystyrene, i.e., EPS.

Chinese Patent Publication No. CN1589185A, published on Mar. 2, 2005, discloses a lost foam casting method, which is characterized in that melt is injected into a sand model formed by embedding a synthetic resin foam model in modeling sand, and a casting product is cast while the model disappears by using the melt, gas generated by the disappearance of the model is discharged to the outside of the sand model by means of a discharge passage provided with a discharge gas inhibiting mechanism; the ventilation of the discharge passage is controlled according to the material and shape of the model, the type and temperature of the melt, and the synthetic resin foam is polystyrene, polymethyl methacrylate or a copolymer thereof.

However, the synthetic resin foam used in the prior art is polystyrene, polymethyl methacrylate or a copolymer thereof, and the main component of EPS is a benzene ring compound, which can be hardly thermally decomposed at a high temperature, but can be easily decomposed at the high temperature of casting molten iron to form a tar-like substance that adheres to the inner surface of the outer coating of the model. Consequently, a large amount of carbon slag is formed at a high temperature of 900° C. or above, which adheres to the surfaces of cast iron and steel, leading to the phenomenon of carbon defect in the casting, This further results in low qualified rate and poor quality of the finally obtained casting when casting cast iron and cast steel.

SUMMARY OF THE INVENTION

For the purpose of addressing the defects present in the prior art, it's a first object of the invention to provide an expandable copolymer resin used for manufacturing a lost foam casting model, which can overcome the technical difficulty of carbon defects and has the advantages of reducing or eliminating the carbon defects when casting cast iron and cast steel.

In order to achieve the above first object, the invention provides the following technical solution:

an expandable copolymer resin used for manufacturing a lost foam casting model, comprising the following components in parts by weight:
100 parts of mixed monomers;
150-250 parts of deionized water;
0.3-0.6 parts of cellulose ether dispersants;
0.15-0.45 parts of sodium salts;
0.25-0.50 parts of initiators;
8-15 parts of foaming agents;
0.1-0.5 parts of molecular weight regulators;
wherein the mixed monomers comprise methyl methacrylate and styrene, in which the methyl methacrylate accounts for 70-95 wt % of the mixed monomers, and the styrene accounts for 5-30 wt % of the mixed monomers;
the sodium salts comprise at least one of sodium sulfate, sodium pyrophosphate and sodium dichromate;
the initiators comprise at least two of tert-butyl peroxyisooctanoate, benzoyl peroxide and tert-butyl peroxybenzoate;
the foaming agents consist of n-pentane, isopentane and petroleum ether in a mass part ratio of 8:(2-6):4;
the molecular weight regulators comprise at least one of divinylbenzene, ethylene glycol dimethacrylate, C8-C12 alkyl mercaptan, carbon tetrabromide and methyl styrene dimer;
the molecular weight of the expandable copolymer resin is 150,000 to 300,000.

In the above technical solution, hydroxyethyl cellulose ether and hydroxypropyl cellulose are mainly selected as the cellulose ether dispersants, thus enabling a good effect of dispersing the components. Regarding the forming agent, the boiling points of n-pentane, isopentane and petroleum ether are low, resulting in less diffusion loss during the foaming process, so that the foaming effect is improved.

The methyl methacrylate adopted in the present application is abbreviated as MMA, and the styrene is abbreviated as ST.

Sodium sulfate is used to reduce the solubility of the mixed monomers in the deionized water, thereby maintaining the stability of the mass of the expandable copolymer resin formed. The sodium pyrophosphate, the sodium dichromate and the sodium sulfate work in coordination with each other to further improve the stability of the mass of the expandable copolymer resin formed.

In the molecular weight regulator, divinylbenzene, ethylene glycol dimethacrylate, C8-C12 alkyl mercaptan, carbon tetrabromide and methyl styrene dimer can regulate the molecular weight of the expandable resin and prevent the resin from over-crosslinking Since the relative molecular mass of bromine atoms is larger than that of hydrogen atoms, in comparison with the existing polystyrene foam, the expandable copolymer resin polymerized by combining MMA with bromine atom has a greatly reduced content of carbon elements in the expandable copolymer resin, facilitating the occurrence rate of carbon defects. Although carbon tetrabromide can reduce carbon defects to a certain extent, hydrogen bromide generated due to the decomposition of carbon tetrabromide at a high temperature has certain toxicity, which brings some hidden danger to the production. The methyl styrene dimer shows the feature of a green product with little distinctive odor, being safer for production environment while reducing the occurrence possibility of carbon defects.

In the present application, MMA accounts for 70-95 wt % of the mixed monomers, and ST accounts for 5-30 wt % of the mixed monomers. By adjusting the ratio of MMA to ST to be in a more appropriate range, and adopting the action of the molecular weight regulators, the molecular weight of the expandable copolymer resin can be kept at 150000-300000, so that the performance of the expandable copolymer resin is more stable.

Further preferably, the mixed monomers further comprise auxiliary agents, wherein the auxiliary agents account for 0-5% of the mixed monomers, the MMA accounts for 65-95% wt of the mixed monomers, and the ST accounts for 5-30% wt of the mixed monomers; the auxiliary agents comprise at least one of butyl acrylate and butyl methacrylate.

Regarding the above technical solution, a research (quality test) shows that the MMA, the ST and the auxiliary agents work in coordination with each other, so that when using a model made of the expandable copolymer resin as obtained for casting, the occurrence of carbon defects is further reduced, and the qualified rate of the obtained casting is improved.

Further preferably, the auxiliary agent is consisted of butyl acrylate and butyl methacrylate in a ratio of 1:1 in parts by mass.

Regarding the above technical solution, a research (quality test) shows that when the auxiliary agent is consisted of butyl acrylate and butyl methacrylate in the above-mentioned ratio in parts by mass, and when the obtained model made of the expandable copolymer resin is used for casting, the occurrence of carbon defects is further reduced, and the qualified rate of the casting is further improved.

Further preferably, the expandable copolymer resin further comprises 1-1.5 parts by weight of plasticizers, wherein the plasticizers comprise at least one of fumaric acid and polycaprolactone.

In the above technical solution, the fumaric acid is non-toxic and has a good bonding effect, has a stable state in air at normal temperature, but can sublimate at 290° C.

According to the invention, at least one of fumaric acid and polycaprolactone is used as a plasticizer, which can not only promote the uniform mixing of other components, but also improve the bonding effect among the components. In addition, the lost foam casting model manufactured by adding the plasticizer has the advantages that, when the lost foam casting model is subjected to the action of high temperature in the casting process, the plasticizer can sublimate and leave no residue, so that the obtained casting has a smooth surface without pits.

The plasticizer can be added as a filler. After the formed expandable copolymer resin is made into a corresponding model, the plasticizer can be sublimated at a high temperature for casting due to heat-absorbing physical and chemical changes such as decomposition, melting, evaporation, or sublimation which brings away part of the heat, and hardly leaves any residue of the plasticizer, thereby reducing the possibility of carbon defects.

Further preferably, the expandable copolymer resin further comprises 0.5-1.5 parts by weight of activating agents, wherein the activating agents comprise at least one of zinc oxide, stearate, carbonate and phosphate.

Through the above technical solution, the activating agent and the foaming agent work in coordination with each other, so that the foaming agent can react more quickly and effectively, the gas generation amount in the casting process is improved, and the possibility of carbon defects on the surface of a casting is further reduced.

Further preferably, the expandable copolymer resin further comprises 0.1-0.4 parts by weight of additives, wherein the additives comprise at least two of polyurethane, polyether and polycaprolactone.

Through the above technical solution, the polyurethane has relatively high flexibility, resilience and fire resistance, and thus the expandable copolymer resin added with the polyurethane has better fire resistance than that without adding the polyurethane.

The polyether has excellent thermal oxidation stability, lubricity and relatively high viscosity, and after the polyether is added, a better adhering effect can be formed between the polyether and other substances, so that the formed expandable copolymer resin has better integrity and thermal oxidation resistance.

The polycaprolactone has excellent compatibility, and can sufficiently coordinate with other components participating in the reaction. Since it is easy to degrade, the expandable copolymer resin added with the polycaprolactone hardly leaves any residues during the casting process.

Therefore, the expandable copolymer resin added with at least two components of polyurethane, polyether and polycaprolactone may further reduce the occurrence possibility of carbon defects in casting.

Further preferably, the expandable copolymer resin further comprises 0.05-0.15 parts by weight of stabilizers, wherein the stabilizers is consisted of an antimony mercaptide stabilizer and calcium stearate.

Through the above technical solution, the antimony mercaptide stabilizer and the calcium stearate can increase the fluidity among the components during mixing. The expandable copolymer resin added with the antimony mercaptide stabilizer and the calcium stearate can keep good stability at a normal temperature, reduce the possibility of bonding between the expandable copolymer resins, and during casting, reduce the possibility of carbon defects on the surface of a formed casting.

It is a second object of the present invention to provide a method for preparing expandable copolymer resin used for manufacturing a lost foam casting model.

In order to achieve the second object, the invention provides the following technical solution:

a method for preparing expandable copolymer resin used for manufacturing a lost foam casting model, comprising the steps of:

step 1, fully mixing deionized water, a cellulose ether dispersant and a sodium salt by parts by weight to form a first mixture;

step 2, fully mixing mixed monomers, a foaming agent, an initiator, a molecular weight regulator, a plasticizer, an activating agent, an additive and a stabilizer by parts by weight to obtain a second mixture;

step 3, adding the second mixture obtained in step 2 into the first mixture obtained in step 1, mixing for 15-20 min, heating to 65-95° C., and reacting for 7-16 h under the pressure of 3-6 kg to obtain a first product;

step 4, sequentially cooling, washing, dehydrating and drying the first product obtained in step 3 to obtain a second product; and step 5, screening the second product obtained in step 4 to obtain granular expandable copolymer resin with the particle size of 20-60 meshes;

in step 4, the cooling is carried out to a temperature of 35-45° C., and the drying temperature is 50-60° C. Through the above technical solution, the preparation is carried out in a one-step mode, so that the production time can be saved, the polymerization reaction can be fully promoted, the molecular weight of the obtained expandable copolymer resin can be kept at 150000-300000, and the performance of the expandable copolymer resin can be more stable.

Correspondingly adding the plasticizers, the activating agents, the additives and the stabilizers in corresponding parts by weight and fully mixing the plasticizer, the activating agent, the additive and the stabilizer with the mixed monomers, the foaming agents, the initiators and the molecular weight regulators in step 2 can facilitate coordination among the above components, so that a more sufficient polymerization effect is achieved in step 3, and the molecular weight of the obtained expandable copolymer resin is kept at 150000-300000.

In summary, the invention has the following beneficial effects:

1. The invention provide a different molecular composition from the existing EPS The carbon content in the existing EPS is about 92%, but for the expandable copolymer resin obtained in the present application, the proportion of components in the mixed monomers can be adjusted according to requirements in the preparation process so as to adjust the carbon content, for example, when the ratio of MMA to ST is 70:30 in parts by mass, the carbon content is about 69.6%; when the ratio of MMA to ST is 95:5 in parts by mass, the carbon content is about 61.6%. In addition, the expandable copolymer resin obtained in the present application contains two oxygen atoms, and the generated CO carries away two carbon atoms at the high temperature of casting, thereby reducing the possibility of carbon defects.

2. At the high temperature of casting, the model made of the existing EPS is different from the model made of expandable copolymer resin according to the present application in terms of the decomposition mechanism. The existing EPS model tends to become tar-like substances and adhere to the inner wall of the outer coating of the model, and when the temperature reaches 900° C. or above, the tar-like substances are carbonized to form carbon slag, which tends to cause carbon defects in the casting; meanwhile, the model made of the expandable copolymer resin in the present application is subjected to zipper-type decomposition at a high temperature, and most of the expandable copolymer resin become gas and low-molecular liquid which can easily enter a sand box through a coating, so that carbon defects of a casting can be effectively reduced or even eliminated.

3. Since at least one of butyl acrylate and butyl methacrylate work coordination with MMA and ST, the obtained expandable copolymer resin reduces the temperature of prefoaming and model processing, and improves the surface smoothness and the finished product rate of the processed model, which, when being used for casing a casting, can further reduce the possibility of carbon defects, and help improve the qualified rate of the obtained casting.

4. Cooperation of the molecular weight regulator and the reaction temperature is helpful to regulate the molecular weight of the expandable copolymer resin formed and reduce the possibility of occurrence of carbon defects in casting when using the present expandable copolymer resin.

DETAILED DESCRIPTION OF THE INVENTION

Hereinafter, the present invention will be described in detail with reference to Examples.

Example 1: an expandable copolymer resin used for manufacturing a lost foam casting model comprises components and their corresponding masses as shown in Table 1 and was prepared through the steps of:

step 1, fully mixing deionized water, a cellulose ether dispersant and sodium salt to form a first mixture;

step 2, fully mixing mixed monomers, a foaming agent, an initiator and a molecular weight regulator to obtain a second mixture;

step 3, adding the second mixture obtained in step 2 into the first mixture obtained in step 1, mixing for 15-20 min, heating to 80° C., reacting for 7 h, then heating to 95° C., reacting for 2 h under the pressure of 3-6 kg to obtain a first product;

step 4, cooling the first product obtained in step 3 to a temperature of 35-45° C., washing with water, dehydrating, and fully drying at a temperature of 50-60° C. to obtain a second product; and step 5, screening the second product obtained in step 4 to obtain granular expandable copolymer resin with a particle size of 20-60 meshes.

A method for preparing a casting, comprising the steps of:

selecting the granular expandable copolymer resin obtained in step 5 according to casting requirements, pre-foaming, carrying out compression modeling on a modeling press, drying the modeled model, coating, drying, putting into a sand box for casting, and casting to obtain a casting.

In particular, the cellulose ether dispersant was consisted of hydroxyethyl cellulose ether and hydroxypropyl cellulose ether in a ratio of 1:1 by mass; the sodium salt was consisted of sodium sulfate, sodium pyrophosphate and sodium dichromate in a ratio of 1:1:1 by mass; the foaming agent was consisted of n-pentane, isopentane and petroleum ether in a ratio of 8:(2-6):4 by mass; the initiator was consisted of tert-butyl peroxyisooctanoate and tert-butyl peroxybenzoate in a ratio of 1:1 by mass; and the molecular weight regulator was consisted of carbon tetrabromide and methyl styrene dimer in a ratio of 1:1 by mass.

Example 2: an expandable copolymer resin used for manufacturing a lost foam casting model, which differed from Example 1 in components included therein and their corresponding masses, as shown in Table 1.

Example 3: an expandable copolymer resin used for manufacturing a lost foam casting model, which differed from Example 1 in the components included therein and their corresponding masses, as shown in Table 1, and, in step 3, heating to 70° C. and reacting for 10 h.

Example 4: an expandable copolymer resin used for manufacturing a lost foam casting model, which differed from Example 1 in the components included therein and the corresponding masses thereof, as shown in Table 1, and in step 3, heating to 75° C., reacting for 8 h, and then heating to 93° C. and reacting for 4 h.

Examples 5-8: an expandable copolymer resin used for manufacturing a lost foam casting model, which differed from Example 1 in the components included therein and their corresponding masses, as shown in Table 1.

Example 9: an expandable copolymer resin used for manufacturing a lost foam casting model, which differed from Example 1 in that 1 kg fumaric acid was also added in step 2.

TABLE 1

Components included in Examples 1-8 and their corresponding masses (kg)

| Components | | Mass | | | | | | | |
|---|---|---|---|---|---|---|---|---|---|
| | | Example 1 | Example 2 | Example 3 | Example 4 | Example 5 | Example 6 | Example 7 | Example 8 |
| Mixed monomer | MMA | 70 | 70 | 70 | 70 | 65 | 95 | 80 | 72 |
| | ST | 30 | 25 | 30 | 25 | 30 | 5 | 15 | 24 |
| | Butyl acrylate | 0 | 0 | 0 | 5 | 2.5 | 0 | 2.5 | 2 |
| | Butyl methacrylate | 0 | 5 | 0 | 0 | 2.5 | 0 | 2.5 | 2 |
| Deionized water | | 250 | 200 | 250 | 250 | 250 | 150 | 200 | 180 |
| Cellulose ether dispersant | | 0.35 | 0.3 | 0.35 | 0.35 | 0.35 | 0.3 | 0.6 | 0.5 |
| Sodium Salt | | 0.3 | 0.3 | 0.3 | 0.3 | 0.3 | 0.15 | 0.45 | 0.25 |
| Initiator | | 0.4 | 0.4 | 0.4 | 0.4 | 0.4 | 0.25 | 0.5 | 0.35 |
| Foaming agent | | 8 | 10 | 15 | 10 | 10 | 12 | 8 | 15 |
| Molecular weight regulator | | 0.5 | 0.3 | 0.15 | 0.3 | 0.4 | 0.1 | 0.25 | 0.15 |

Example 10: an expandable copolymer resin used for manufacturing a lost foam casting model, which differs from Example 9 in that 1.2 kg fumaric acid was added in step 2.

Example 11: an expandable copolymer resin used for manufacturing a lost foam casting model, which differed from Example 9 in that 1.5 kg fumaric acid was added in step 2.

Example 12: an expandable copolymer resin used for manufacturing a lost foam casting model, which differed from Example 1 in that 1.1 kg polycaprolactone was also added in step 2.

Example 13: an expandable copolymer resin used for manufacturing a lost foam casting model, which differed from Example 12 in that 1.3 kg plasticizer was added in step 2, which was consisted of fumaric acid and polycaprolactone in a ratio of 1:2 by weight.

Example 14: an expandable copolymer resin used for manufacturing a lost foam casting model, which differed from Example 12 in that 1.5 kg plasticizer was added in step 2, which was consisted of fumaric acid and polycaprolactone in a ratio of 1:1 by weight.

Example 15: an expandable copolymer resin used for manufacturing a lost foam casting model, which differed from Example 9 in that 0.5 kg zinc oxide and 0.5 kg stearate were also added in step 2.

Example 16: an expandable copolymer resin used for manufacturing a lost foam casting model, which differed from Example 15 in that 0.1 kg polyurethane and 0.3 kg polyether were also added in step 2.

Example 17: an expandable copolymer resin used for manufacturing a lost foam casting model, which differed from Example 16 in that 0.05 kg antimony mercaptide stabilizer and 0.1 kg calcium stearate were also added in step 2.

Comparative Example 1: a lost foam production process of an automobile engine cylinder body, which differed from Example 1 in that the process comprised the steps of:

step 1, the bead pre-expanding process: firstly, performing a pre-foaming process of selected EPS beads for 40-60 s under the conditions of pipeline pressure of 0.1 Mpa-0.2 Mpa, expansion chamber pressure of 0.03 Mpa-0.06 Mpa and temperature of 90° C.-100° C.; and then carrying out a curing treatment for (2-12)h at a temperature of (20-25)° C. such that the EPS bead density was maintained at 2.1-2.2 g/L.

step 2, the blank model fabricating process: firstly, subjecting the blank model of the automobile engine cylinder body to fragment processing according to the structural characteristics of the engine to be manufactured, specifically adopting a method of external integral model manufacturing and internal inlaying of a cylinder sleeve; and then filling the EPS beads cured after pre-expanding in step 1 into a blank model for modeling by adopting a material suction filling method;

step 3, the drying process: drying the blank model manufactured in step 2 for (10-12)h under the conditions that the temperature is (45-50)° C. and the humidity is (15-20)RH.

step 4, the model bonding process: bonding the parts dried in step 2 together by using a model bonding adhesive, and meanwhile, pre-coating a paste coating locally.

step 5, a dip coating process: dip coating a coating on the lost foam pattern bonded in step 4, including three steps of first dip coating, recoating and selective coating; wherein in the first dip coating, integrally dip coating the blank model bonded in step 4, and drying according to step 6; in recoating, carrying out a secondary dip coating on the dried blank model integrally, and drying according to step 6; and finally in selective coating, locally pouring and coating the dried blank model, filling resin sand and drying according to step 6.

step 6, the drying process after dip coating: performing drying treatment for (36-48)h on the blank model that was dip-coated in step 5 under the conditions that the temperature is (50-60)° C. and the humidity is (15-20);

step 7, the modeling casting process: placing a sand box under a shower sand filling machine to fill sand while starting a vibrating table; placing the blank model dried in step 6 on modeling sand, and manually filling 70/100 meshes of modeling sand locally by using a pressurizing sand flushing machine; starting the sand filling machine to fill sand, and stopping sand filling and compacting when the modeling sand reaches a vertical pouring head of the blank model; cleaning the modeling sand of the vertical pouring head at the upper end of the blank model sprue, smearing bonding adhesive, adhering a filter screen, placing a sprue cup, and covering plastic cloth on a sand box; starting the sand filling machine to fill the sand box until it was full; connecting a negative pressure pipe, starting a negative pressure machine, pouring molten metal into the blank model from the sprue cup, keeping casting under the conditions that the casting negative pressure is 0.04 Mpa-0.06 Mpa, the casting speed is 5 kg/s and the casting temperature is 1490° C.-1500° C., and finally obtaining a cast engine cylinder body; through this production process, sand sticking and water leakage can be effectively prevented; the qualified rate of the produced automobile engine cylinder body is improved and can reach 94%-97%, rendering a better quality of the engine cylinder body.

Comparative Example 2: a preparation method of modified expandable polystyrene copolymer particles special for a lost foam, which differed from the Example 1 in that the preparation method comprised the steps of:

taking 120 parts of water, 95 parts of styrene, 5 parts of methyl methacrylate, 1 part of suspending agents and 0.01 part of anionic surfactants; 0.2 parts of benzoyl peroxide; 0.1 parts of nucleating agents; 0.3 parts of organic bromine; 0.2 parts of dicumyl peroxide; 0.1 parts of t-butyl peroxybenzoate; 0.05 parts of molecular weight regulators; and then sequentially adding water, the suspending agents, the surfactants, styrene, methyl methacrylate, benzoyl peroxide, the nucleating agents, organic bromine, dicumyl peroxide and tert-butyl peroxybenzoate into a reactor, sealing and uniformly mixing.

The reactor was then heated at a rate of 0.5° C./min and held at constant temperature for 400 minutes as the temperature was raised to 83° C.

After capping, nitrogen replacement was carried out for 3 times and 6 parts of foaming agents were pressed in.

The reactor was then heated at a rate of 0.5° C./minute to a reaction temperature of 120° C. and a pressure of 0.65 mPa and held at this temperature and pressure for 300 minutes.

And then the reactor as cooled by using cooling water, so that the temperature of the materials in the reactor is reduced to 35° C.

And then dehydrating, drying and screening of the materials were carried out.

And then, 0.3 parts of surface coating agents were added, stirring was conducted, the materials and the surface coating agents were fully and uniformly mixed, and packaged after mixing to obtain the modified expandable polystyrene copolymer particles special for the lost foam.

Casting Quality Test

Test samples: a model made using the expandable copolymer resin used for manufacturing a lost foam casting model obtained in Examples 1-17 is adopted, the castings obtained were taken as test samples 1-17, and a model made using the expandable copolymer resin used for manufacturing a lost foam casting model obtained in Comparative Examples 1-2 is adopted, the castings obtained were taken as comparative samples 1-2. Each of the test samples and comparative samples includes 100 ductile iron pipe pieces (d=200 mm), 100 four-cylinder bodies (gray iron workpiece) and 100 ductile iron cylinder barrel bodies (d=300*700 complete workpiece).

Test method: the surface condition of ductile iron pipe (d=200 mm), four-cylinder bodies (gray iron workpiece) and ductile iron cylinder barrel bodies (d=300*700 complete workpiece) in each of the test samples and comparative samples was observed, the density of the model and the qualified rate were examined, recorded and analyzed.

Test results: the density, surface condition and qualified rate of ductile iron pipe pieces, four-cylinder bodies and ductile iron cylinder bodies in test samples 1-17 and comparative samples 1-2 are shown in Table 2.

TABLE 2

Density, surface condition, qualified rate of ductile iron pipe pieces, four-cylinder bodies, and ductile iron cylinder barrel bodies in test samples 1-17 and comparative samples 1-2

| | Model | | Test index | | | | | |
|---|---|---|---|---|---|---|---|---|
| | | | Ductile iron pipe piece (d = 200 mm) | | Four-cylinder body (gray iron workpiece) | | Ductile iron cylinder barrel body (d = 300 * 700 complete workpiece) | |
| Test samples | density (g/L) | Model surface condition | Surface condition | Qualified rate (%) | Surface condition | Qualified rate (%) | Surface condition | Qualified rate (%) |
| Test sample 1 | 21 | smooth surface | Good surface quality | 92 | Good surface quality | 96 | Good surface quality | 94 |
| Test sample 2 | 22 | smooth surface | Good surface quality | 93 | Good surface quality | 93 | Good surface quality | 96 |
| Test sample 3 | 22 | smooth surface | Good surface quality | 91 | Good surface quality | 91 | Good surface quality | 96 |
| Test sample 4 | 21 | smooth surface | Good surface quality | 92 | Good surface quality | 94 | Good surface quality | 93 |
| Test sample 5 | 21 | smooth surface | Good surface quality | 98 | Good surface quality | 95 | Good surface quality | 96 |
| Test sample 6 | 22 | smooth surface | Good surface quality | 91 | Good surface quality | 90 | Good surface quality | 93 |
| Test sample 7 | 21 | smooth surface | Good surface quality | 91 | Good surface quality | 92 | Good surface quality | 93 |
| Test sample 8 | 21 | smooth surface | Good surface quality | 92 | Good surface quality | 91 | Good surface quality | 95 |
| Test sample 9 | 22 | smooth surface | Good surface quality | 94 | Good surface quality | 92 | Good surface quality | 95 |
| Test sample 10 | 22 | smooth surface | Good surface quality | 93 | Good surface quality | 91 | Good surface quality | 95 |
| Test sample 11 | 22 | smooth surface | Good surface quality | 94 | Good surface quality | 92 | Good surface quality | 95 |
| Test sample 12 | 21 | smooth surface | Good surface quality | 95 | Good surface quality | 92 | Good surface quality | 95 |
| Test sample 13 | 22 | smooth surface | Good surface quality | 95 | Good surface quality | 93 | Good surface quality | 95 |
| Test sample 14 | 21 | smooth surface | Good surface quality | 95 | Good surface quality | 93 | Good surface quality | 95 |
| Test sample 15 | 21 | smooth surface | Good surface quality | 95 | Good surface quality | 94 | Good surface | 95 |

TABLE 2-continued

Density, surface condition, qualified rate of ductile iron pipe pieces, four-cylinder bodies, and ductile iron cylinder barrel bodies in test samples 1-17 and comparative samples 1-2

| | | | Test index | | | | | |
|---|---|---|---|---|---|---|---|---|
| | | Model | Ductile iron pipe piece (d = 200 mm) | | Four-cylinder body (gray iron workpiece) | | Ductile iron cylinder barrel body (d = 300 * 700 complete workpiece) | |
| Test samples | density (g/L) | Model surface condition | Surface condition | Qualified rate (%) | Surface condition | Qualified rate (%) | Surface condition | Qualified rate (%) |
| Test sample 16 | 21 | smooth surface | Good surface quality | 95 | Good surface quality | 93 | Good surface quality | 95 |
| Test sample 17 | 21 | smooth surface | Good surface quality | 95 | Good surface quality | 93 | Good surface quality | 95 |
| comparative sample 1 | 25 | Relatively rough surface | Relatively poor surface quality | 20 | Relatively poor surface quality | 35 | Relatively poor surface quality | 6 |
| comparative sample 2 | 24 | Relatively smooth surface | Relatively good surface quality | 78 | Relatively good surface quality | 83 | Relatively good surface quality | 88 |

As can be seen from Table 2, the ductile iron pipe pieces (d=200 mm), the four-cylinder bodies (gray iron workpiece) and the ductile iron cylinder barrel bodies (d=300*700 complete workpiece) in the test samples 1-17 are smooth in their surfaces and good in quality, and the qualified rate of the ductile iron pipe pieces (d=200 mm) is up to 91%, and up to 96% in the best cases; the qualified rate of the four-cylinder bodies (gray iron workpiece) is up to 90%, and up to 96% in the best cases; the qualified rate of the ductile iron cylinder barrel bodies (d=300*700) is up to 93%, and up to 97% in the best cases.

However, in comparative sample 1, the ductile iron pipe pieces (d=200 mm), four-cylinder bodies (gray iron workpiece) and ductile iron cylinder barrel bodies (d=300*700 complete workpiece) were rough in their surfaces and the quality was poor, and the qualified rate of ductile iron pipe pieces (d=200 mm) was only 20%; the qualified rate of the four-cylinder bodies (gray iron workpiece) was only 35%; the qualified rate of the ductile iron cylinder barrel bodies (d=300*700) was only 6%. The above significant differences were due to that the mixed monomers used and the mixed monomers in the test samples 1-17 were different in their components and the proportion thereof, which showed that it was difficult to meet the requirement of high-quality castings taking the EPS as a raw material of the lost foam.

In comparative sample 2, the surface quality of ductile iron pipe pieces (d=200 mm), four-cylinder bodies (gray iron workpiece) and ductile iron cylinder barrel bodies (d=300*700 complete workpiece) was better, and the qualified rate of ductile iron pipe pieces (d=200 mm) was 78%; the qualified rate of the four-cylinder bodies (gray iron workpieces) can reach 83%; the qualified rate of ductile iron cylinder barrel bodies (d=300*700 complete workpieces) can reach 88%, which, in comparison with comparative sample 1, showed some breakthrough, indicating that the use of MMA and ST to prepare a lost foam can improve the surface condition and qualified rate of castings to some extent. However, when comparing comparative sample 2 with test samples 1-17, although both test samples 1-17 and comparative sample 2 used MMA and ST reaction for preparing the lost foam, comparative sample 2 was inferior regarding the casting surface condition, surface quality or qualified rate, indicating that the components of the mixed monomers and the corresponding proportion did have a certain impact on the casting surface condition, surface quality and qualified rate. In addition, although the difference between the qualified rates of different castings in test samples 1-17 and comparative sample 2 was not very great, an improvement of the qualified rate is of great significance to a relatively mature industry.

The above-mentioned examples are merely preferred embodiments of the present invention, and the scope of the present invention is not limited to the above-mentioned embodiments, and all technical solutions falling within the spirit of the present invention fall within the scope of the present invention. It should be noted that those skilled in the art will appreciate that various modifications and adaptations can be made without departing from the spirit and scope of the present invention.

The invention claimed is:

1. An expandable copolymer resin used for manufacturing a lost foam casting model, prepared from the following components in parts by weight:
    100 parts of mixed monomers;
    150-250 parts of deionized water;
    0.3-0.6 parts of cellulose ether dispersant;
    0.15-0.45 parts of sodium salt;
    0.25-0.50 parts of initiator;
    8-15 parts of foaming agent;
    0.1-0.5 parts of molecular weight regulator;
    the mixed monomers comprise methyl methacrylate and styrene, the methyl methacrylate accounts for 70-95 wt % of the mixed monomers, and the styrene accounts for 5-30 wt % of the mixed monomers;
    the sodium salt comprises at least one of sodium sulfate, sodium pyrophosphate and sodium dichromate;
    the initiator comprises at least two of tert-butyl peroxyisooctanoate, benzoyl peroxide and tert-butyl peroxybenzoate;
    the foaming agent is consisted of n-pentane, isopentane and petroleum ether in a mass part ratio of 8:(2-6):4;
    the molecular weight regulator comprises at least one of divinylbenzene, ethylene glycol dimethacrylate, C8-C12 alkyl mercaptan, carbon tetrabromide and methyl styrene dimer;
    the molecular weight of the expandable copolymer resin is 150,000 to 300,000.

2. The expandable copolymer resin used for manufacturing a lost foam casting model according to claim 1, wherein the mixed monomers further comprise an auxiliary agent, and wherein the auxiliary agent accounts for 2-5 wt % of the mixed monomers, the methyl methacrylate accounts for 70-95% wt of the mixed monomers, and the styrene accounts for 5-30% wt of the mixed monomers; the auxiliary agent comprises at least one of butyl acrylate and butyl methacrylate.

3. The expandable copolymer resin used for manufacturing a lost foam casting model according to claim 2, wherein the auxiliary agent is consisted of butyl acrylate and butyl methacrylate in a ratio of 1:1 in parts by mass.

4. The expandable copolymer resin used for manufacturing a lost foam casting model according to claim 1, wherein the expandable copolymer resin further comprises 1-1.5 parts by weight of plasticizer, wherein the plasticizer comprises at least one of fumaric acid and polycaprolactone.

5. The expandable copolymer resin used for manufacturing a lost foam casting model according to claim 1, wherein the expandable copolymer resin further comprises 0.1-0.4 parts by weight of additive, wherein the additive comprises at least two of polyurethane, polyether and polycaprolactone.

6. The expandable copolymer resin used for manufacturing a lost foam casting model according to claim 1, wherein the expandable copolymer resin further comprises 0.05-0.15 parts by weight of stabilizer, wherein the stabilizer is consisted of an antimony mercaptide stabilizer and calcium stearate.

* * * * *